US012437907B1

(12) United States Patent
Yu et al.

(10) Patent No.: US 12,437,907 B1
(45) Date of Patent: Oct. 7, 2025

(54) WIRE CABLE WITH MAGNETIC ATTRACTION EFFECT AND PREPARATION METHOD THEREOF

(71) Applicant: Anyun Yu, Guangdong (CN)

(72) Inventors: Anyun Yu, Guangdong (CN); Hongyun Yu, Guangdong (CN)

(73) Assignee: Anyan Yu, Guangdong (CN)

( * ) Notice: Subject to any disclaimer, the term of this patent is extended or adjusted under 35 U.S.C. 154(b) by 0 days.

(21) Appl. No.: 19/182,814

(22) Filed: Apr. 18, 2025

(30) Foreign Application Priority Data

Feb. 6, 2025 (CN) ......................... 202510133542.4
Feb. 10, 2025 (CN) ......................... 202510146160.5

(51) Int. Cl.
*H01F 1/00* (2006.01)
*H01B 7/18* (2006.01)
*H01F 1/147* (2006.01)

(52) U.S. Cl.
CPC ............... *H01F 1/147* (2013.01); *H01B 7/18* (2013.01)

(58) Field of Classification Search
CPC .................................. H01F 1/147; H01B 7/18
See application file for complete search history.

(56) References Cited

FOREIGN PATENT DOCUMENTS

| | | | |
|---|---|---|---|
| CN | 115352012 | A | 11/2022 |
| CN | 118834516 | A | 10/2024 |
| CN | 118895028 | A | 11/2024 |
| JP | 3247722 | U | 7/2024 |

OTHER PUBLICATIONS

Huang, Z., et al., “Physical and chemical properties data manual of solid propellant and functional materials”, National Defense Industry Press, May 31, 2023, pp. 232-237.
Wang, J., et al., “Quick reference manual for varieties and selection of plastic additives”, Cultural Development Press, Jan. 31, 2017, pp. 178-182.
Hongjun, F., “Inorganic Chemistry”, Yunnan People’s Publishing House, Apr. 30, 2006, pp. 271-272.
Zhang, X., “Wire and cable manual”, Machinery Industry Press, vol. 3, Third edition, pp. 588-589.
Wang, L., et al., “Polymer Material”, China Light Industry Press, Jan. 31, 2009, pp. 295-299.
Tang, S. et al., “Forming and processing of polymer materials (third edition)”, Zhongtong Light Industry Press, Dec. 31, 2020, pp. 73-75.
First Office Action received in corresponding Chinese patent application No. 202510146160.5, dated Aug. 16, 2025, 18 pages.

*Primary Examiner* — Timothy J Thompson
*Assistant Examiner* — Aditya Sharma
(74) *Attorney, Agent, or Firm* — Cooper Legal Group, LLC

(57) ABSTRACT

The present application relates to a wire cable with a magnetic attraction effect and a preparation method thereof. The wire cable sequentially includes a braid layer, a protective layer and a magnetic attraction layer from exterior to interior. The magnetic attraction layer is prepared from the following raw materials in percentage by weight: 40-50% of a thermoplastic elastomer, 2-3% of a compatilizer, 3-6% of a stabilizer, 5-10% of a lubricant, 10-15% of a phenolic resin and a balance of a magnetic attraction filler; and the protective layer is prepared from the following raw materials in percentage by weight: 80-90% of the thermoplastic elastomer, 1-2% of the compatilizer, 0.5-1% of a flexibilizer and a balance of the phenolic resin. By means of the magnetic attraction layer, wires can be adsorbed easily and arranged automatically, thereby avoiding a phenomenon that the traditional wires are disordered during use and storage.

10 Claims, 2 Drawing Sheets

A — A

WIRE CABLE WITH MAGNETIC ATTRACTION EFFECT AND PREPARATION METHOD THEREOF

CROSS-REFERENCE TO RELATED APPLICATION

This application claims the priority to Chinese patent application No. 202510133542.4, filed on Feb. 6, 2025, and Chinese patent application No. 202510146160.5, filed on Feb. 10, 2025. The entireties of Chinese patent application No. 202510133542.4 and Chinese patent application No. 202510146160.5 are hereby incorporated by reference herein and made a part of this specification.

TECHNICAL FIELD

The present application relates to the technical field of cable processing, and particularly relates to a wire cable with a magnetic attraction effect and a preparation method thereof.

BACKGROUND ART

Wires for everyday use, such as data cables, charging cables and socket cables, provide necessary power and data transmission for household electronic devices, and become an indispensable part of the life. However, with the increase of the electronic devices, the number of the required wires has been increased accordingly. No enough storage spaces are provided for these wires in many families or offices, and the wires are easily disordered during use and storage, such that the wires are often carelessly stacked on the table or ground or in the corner, thereby affecting the aesthetic environment and possibly causing potential safety hazards. For example, mutually tangled wires may cause poor current transmission, and even initiate short circuit and other problems. Meanwhile, the wires are easily worn, compressed or pulled during long-term use and storage, thereby causing broken wire skin and internal circuit exposure or breakage, and shortening the service life of the wires.

SUMMARY

To solve the problem that wires for everyday use are difficult to store and are easily damaged due to wear, compression or pulling, the present application provides a wire cable with a magnetic attraction effect and a preparation method thereof.

In a first aspect, the present application provides a wire cable with a magnetic attraction effect, adopting the following technical solution.

A wire cable with a magnetic attraction effect, sequentially including a braid layer, a protective layer and a magnetic attraction layer from exterior to interior, wherein the magnetic attraction layer is prepared from the following raw materials in percentage by weight:

thermoplastic elastomer 40-50%;
compatilizer 2-3%;
stabilizer 3-6%;
lubricant 5-10%;
phenolic resin 10-15%; and
a balance of a magnetic attraction filler;
the protective layer is prepared from the following raw materials in percentage by weight:
thermoplastic elastomer 80-90%;
compatilizer 1-2%;

flexibilizer 0.5-1%; and
a balance of the phenolic resin.

By adopting the above technical solutions, the wires which can be automatically rolled in the wire cable reduce the possibility that the wires are mutually tangled and overlapped, thereby decreasing potential safety hazards such as poor current transmission and short circuit, caused by disordered wires. Due to introduction of the magnetic attraction layer, the wires can be automatically adsorbed and rolled into a bundle, and then the problem that the traditional wires are easily scattered and disordered during use is effectively solved. Thus, not only the cleanliness of a home or office environment is improved, but also the space appearance is enhanced, so that wire management is convenient and efficient. Meanwhile, the design of the magnetic wire reduces wear, compression, and pulling during long-term use and storage, helping to protect the internal structures of the wires, avoiding the problems such as broken skin and internal circuit breakage, significantly prolonging the service life of the wires and decreasing the frequency and cost of wire replacement.

The magnetic attraction layer is prepared from the thermoplastic elastomer, the compatilizer, the stabilizer, the lubricant, the phenolic resin and the magnetic attraction filler, wherein the magnetic attraction filler is a key component for realizing a magnetic attraction function in the magnetic attraction layer and can produce an enough magnetic force, so that the wires can be mutually adsorbed and arranged into a bundle. The thermoplastic elastomer serving as a major component of the magnetic attraction layer provides excellent elasticity and flexibility, so that the wire is difficult to damage during bending and pulling. The phenolic resin has excellent insulating property and heat resistance and can increase the insulating strength and temperature classification of the magnetic attraction layer, thereby ensuring the safety and stability of the wire during current transmission. Meanwhile, the magnetic filler is distributed in the thermoplastic elastomer, and the possibility that the magnetic attraction filler falls off can be decreased. The compatilizer has effects of promoting the compatibility among various components in the magnetic attraction layer, ensuring the uniformity and the stability of the magnetic attraction layer and helping to prevent the layering or peeling phenomenon among the components, thereby improving the overall performance of the wire. The stabilizer can prevent chemical changes of the magnetic attraction layer during processing, storage and use, and then maintain stable physical and chemical properties of the magnetic attraction layer. This is conducive to prolonging the service life of the wire and increasing the reliability of the wire. The lubricant achieves a lubrication effect during processing of the magnetic attraction layer, which is conducive to reduction of the processing temperature and pressure, and increase of the production efficiency. Meanwhile, friction and wear of the surface of the wire can be decreased, thereby increasing the smoothness and the beauty of the wire.

The protective layer is prepared from the thermoplastic elastomer, the phenolic resin, the compatilizer and the flexibilizer. By virtue of synergistic effects of the thermoplastic elastomer, the phenolic resin, the compatilizer and the flexibilizer, the pulling resistance, wear resistance and ageing resistance of the wire are improved, the service life is prolonged, and the insulating property of the wire is further improved, thereby preventing the potential safety hazards such as current leakage and short circuit. Meanwhile, due to addition of the flexibilizer, the protective layer is softer, and wear and compression of the wire during storage and use can be decreased, thereby protecting the electrical components in the wire against damage.

Connection stability between the magnetic attraction layer and the protective layer is one of the most critical factors that ensure the overall performance and service life of the wire. By virtue of a reasonable raw material ratio and process design, both the magnetic attraction layer and the protective layer include the same thermoplastic elastomer and phenolic resin, so that an excellent bonding force can be formed between the magnetic attraction layer and the protective layer during processing, thereby avoiding undesirable phenomena of the wire during use, such as layering and falling off. Meanwhile, since the magnetic attraction layer and the protective layer are tightly bonded and have excellent performance characteristics respectively, the wire cable has the characteristics of being durable and reliable, can maintain stable performance during long-term use and storage, and can prolong the service life.

Preferably, the magnetic attraction filler is a modified magnetic attraction filler, and is prepared by the following method:

1) placing the magnetic attraction filler into a solvent, adding a silane coupling agent under stirring, heating a resulting solution to 50-60° C., and stirring the resulting solution for 1-2 h to obtain a silanized magnetic attraction filler mixture; and
2) performing a polymerization reaction for 3-5 hours at 50-80° C. with the silanized magnetic attraction filler mixture, vinylpyrrolidone, methyl methacrylate, a cross-linking agent and an initiator under a protection of nitrogen, filtering a product mixture to obtain a filter residue, and eluting the filter residue to obtain the modified magnetic attraction filler.

By adopting the above technical solutions, the magnetic attraction filler has higher dispersity and can be more uniformly distributed in a system of the thermoplastic elastomer, and an effective action of the magnetic attraction filler in the magnetic attraction layer is ensured, so that the wire cable has more stable and reliable magnetic attraction performance. Meanwhile, due to tight binding of the modified magnetic attraction filler and the thermoplastic elastomer, overall mechanical properties of the magnetic attraction layer, including higher strength and more excellent toughness and wear resistance, are enhanced, so that the wire cable is more durable in use.

The magnetic attraction filler is placed into the solvent and the silane coupling agent is added to react, so that an organosilane layer can be formed on the surface of the magnetic attraction filler. On the basis of the silanized magnetic attraction filler, monomers such as vinylpyrrolidone and methyl methacrylate are introduced through the polymerization reaction, and a polymer coating layer is formed. The polymer coating layer can not only further increase the compatibility of the magnetic attraction filler and the thermoplastic elastomer, but also decrease agglomeration between magnetic attraction filler particles, thereby increasing the dispersion uniformity of the filler in the thermoplastic elastomer.

Preferably, the raw material used for preparing the modified magnetic attraction filler includes the following components in parts by weight:

magnetic attraction filler 20 parts;
solvent 25-30 parts;
silane coupling agent 4-6 parts;
vinylpyrrolidone 4-6 parts;
methyl methacrylate 2-3 parts;
cross-linking agent 0.1-0.3 part; and
initiator 0.1-0.2 part.

By adopting the above technical solutions, the surface of the magnetic attraction filler is effectively modified by accurately controlling the dosage of each component, thereby significantly increasing the dispersity and compatibility of the magnetic attraction filler in the system of the thermoplastic elastomer. The modified magnetic attraction filler not only maintains the original magnetic attraction performance, but also enhances the bonding force with the thermoplastic elastomer, so that the magnetic attraction layer of the wire cable is more uniform and stable.

Preferably, the magnetic attraction filler is neodymium iron boron (NdFeB).

By adopting the above technical solutions, the magnetic attraction of the magnetic attraction layer is further increased, enabling the magnetic attraction to meet the magnetic arrangement needs of the wire cable, ensuring that the wires remain orderly and untangled during storage and use. Meanwhile, the NdFeB has high machinability. The NdFeB can be made into shapes and sizes meeting specific use by virtue of various machining manners, thereby meeting the needs of the magnetic attraction filler in different application scenarios.

Preferably, the magnetic attraction filler is composed of FeCo, FeNi, Fe, Co and Ni in a weight ratio of (4-6):(5-10):(2-4):(1-2):5.

By adopting the above technical solutions, the types and proportions of alloy of the magnetic filler are optimized, and the magnetic attraction of the magnetic attraction layer is further increased, enabling the magnetic attraction to meet the magnetic arrangement needs of the wire cable, ensuring that the wires remain orderly and untangled during storage and use. Meanwhile, the synergistic effect among the alloy components endows the magnetic attraction filler with excellent magnetic conductivity and saturation induction density, so that the wire can give quick response and can be maintained stable during magnetic attraction.

Preferably, the thermoplastic elastomer is at least one of a thermoplastic polyurethane elastomer, a styrenic thermoplastic elastomer, a thermoplastic olefin elastomer, a thermoplastic polyester elastomer and a thermoplastic polyamide elastomer.

By adopting the above thermoplastic elastomers, not only the wire cable is endowed with excellent elasticity and flexibility so that the wire cable is easy to bend and store, but also the wire cable has excellent wear resistance and ageing resistance, and the service life of the wire is effectively prolonged. Meanwhile, the wire cable has certain wear resistance and corrosion resistance, and the service life of the wire cable can be prolonged. By selecting these thermoplastic elastomers as components of the magnetic attraction layer and the protective layer, not only the overall performance of the wire cable is increased, but also the reliability and durability of the wire cable in various application scenarios can be ensured, thereby providing safe, convenient and efficient use experience of the wire cable for users.

Preferably, the phenolic resin is a linear phenolic resin.

The linear phenolic resin has excellent mechanical property and chemical stability, and can enhance the strength and hardness of the wire cable and increase the wear resistance and corrosion resistance of the wire cable. Additionally, due to thermoplasticity of the linear phenolic resin, the wire cable is easy to form and mold during processing, thereby facilitating improvement of the production efficiency.

Preferably, the compatilizer includes at least one of a maleic anhydride grafted styrene-ethylene/butene styrene block copolymer, a maleic anhydride grafted ethylene-octene copolymer, a maleic anhydride grafted ethylene-vinyl acetate copolymer, a maleic anhydride grafted ethylene-butadiene block copolymer, maleic anhydride grafted polyurethane and maleic anhydride grafted polyethylene.

The above compatilizers provide excellent compatibility for different materials in the magnetic attraction layer and the protective layer. These compatilizers can effectively improve the interface bonding strength among the various components, and prevent the layering or peeling phenomenon between the magnetic attraction layer and the protective layer and in each layer, thereby increasing the overall strength and stability of the wire cable. In addition, the addition of the compatilizers facilitates the increase of weather resistance and ageing resistance of the wire cable, and the prolongation of the service life of the wire cable.

Preferably, the lubricant is composed of oleamide, ethylene-bis-stearamide and calcium stearate in a weight ratio of (3-5):(1-2):6.

By adopting the above technical solutions, not only friction coefficients among various raw materials of the magnetic attraction layer can be effectively decreased so that the machining process is more smooth and the energy consumption and equipment wear are decreased, but also the lubricant can be uniformly distributed in the materials, thereby preventing accumulation of heat produced by friction and avoiding degradation of the raw materials due to overheating. Meanwhile, the lubricant further has certain lubricating durability and can maintain a stable lubrication effect during long-term machining, thereby ensuring production efficiency and stable product quality.

Preferably, the flexibilizer includes at least one of chlorinated polyethylene, a methyl methacrylate-butadiene-styrene terpolymer, an acrylate copolymer and a polyolefin elastomer.

By adopting the above technical solutions, the toughness of the protective layer of the wire cable can be significantly increased. These flexibilizers can effectively absorb and disperse external impact forces, thereby preventing the wire cable from being broken or damaged due to excessive stress during use. Meanwhile, the flexibilizers can increase tearing strength and puncture resistance of the protective layer, so that the wire cable is more durable and reliable.

In a second aspect, the present application provides a method for preparing the wire cable with the magnetic attraction effect, adopting the following technical solutions.

A method for preparing the wire cable with the magnetic attraction effect, including the following preparation steps:

S1, mixing the thermoplastic elastomer, the compatilizer, the stabilizer, the lubricant, the phenolic resin and the magnetic attraction filler to obtain a mixture 1;

S2, mixing the thermoplastic elastomer, the phenolic resin, the compatilizer and the flexibilizer to obtain a mixture 2;

S3, simultaneously extruding the mixture 1 and the mixture 2 in a double-layer co-extrusion manner to obtain a magnetic attraction layer and a protective layer bonded together; and S4, putting braided wires into a high-speed braiding machine, braiding the wires to form a braid layer around the protective layer to obtain a semi-finished wire cable, and magnetizing the semi-finished wire cable by magnetizing equipment to obtain the wire cable with the magnetic attraction effect.

By adopting the above technical solutions, the thermoplastic elastomer, the compatilizer, the stabilizer, the lubricant, the phenolic resin and the magnetic attraction filler are mixed to prepare the mixture 1, thereby providing necessary magnetism and stability for the magnetic attraction layer and ensuring that the wire cable can be firmly adsorbed onto a magnetic surface. Secondly, through the addition of the flexibilizer, the toughness and the impact resistance of the protective layer are significantly enhanced, thereby providing an extra protection for the wire cable and preventing the wire cable from being damaged in a severe environment.

By adopting the double-layer co-extrusion manner, the mixture 1 and the mixture 2 are simultaneously extruded, which not only tightly bonds the magnetic attraction layer and the protective layer, but also ensures the uniformity and the stability of the overall structure of the wire cable.

To sum up, the present application has beneficial effects as follows:

1. Automatic arrangement and storage: the magnetic attraction layer is prepared from the thermoplastic elastomer, the compatilizer, the stabilizer, the lubricant, the phenolic resin and the magnetic attraction filler, so that the wires can be mutually adsorbed and easily and automatically arranged into a bundle, thereby avoiding the trouble that the traditional wires are easily scattered and tangled during use. Thus, not only the wire management convenience is increased, but also the home or office environment is more clean and orderly.
2. Enhancement of durability: the protective layer adopts a high proportion of thermoplastic elastomer as a major raw material and is added with an appropriate amount of the phenolic resin, compatilizer and flexibilizer, so that the entire wire has high wear resistance, pulling resistance and ageing resistance. This design effectively prolongs the service life of the wire, and decreases the potential safety hazards caused by skin damage and internal circuit exposure or breakage of the wire.
3. Improvement of safety: the design of the magnetic attraction wire decreases the possibility that the wires are mutually tangled during storage and use, thereby reducing the safety risk, such as poor current transmission and short circuit, caused by disordered wires. In addition, material selection of the braid layer and the magnetic attraction layer meets the safety standards, thereby further ensuring the use safety of the wire.

DETAILED DESCRIPTION

Example S

Polyurethane is purchased from Suzhou Tengjiecheng International Trade Co., Ltd., with the trade mark of 1185A and the brand of BASF Corporation.

Styrene-butadiene-styrene triblock copolymer is purchased from Dongguan Shengli New Material Co., Ltd., with the model of 611.

Thermoplastic polyolefin (TPO) is purchased from Dongguan Junyan Plastic Material Co., Ltd., with the trade mark of CMN303.

Maleic anhydride grafted styrene-ethylene/butene-styrene block copolymer is purchased from Dongguan Zhangmutou Hongji Plasticizing Firm, with the model of Li Changrong 9901.

Maleic anhydride grafted ethylene-octene copolymer is purchased from Shanghai Sunny New Material Co., Ltd., with the model of CMG9805.

Maleic anhydride grafted ethylene-vinyl acetate copolymer is purchased from Dongguan Taotao Plastic Material Co., Ltd., with the model of 21E533.

Chlorinated polyethylene is purchased from Dongguan Yingxiang Plastic Material Co., Ltd., with the model of CPE135A.

Acrylate copolymer is an ethylene acrylate copolymer and is purchased from Arifu (Shanghai) New Material Technology Co., Ltd., with the model of AX8820.

Methyl methacrylate-butadiene-styrene terpolymer is purchased from Shanghai Yiji Industrial Limited Company, with the CAS of 25053-09-2.

Phenolic resin is purchased from Jinan Dahui Chemical Technology Co., Ltd., with the CAS of 9003-35-4, and a molecular formula of $(C_8H_6O_4)$ n.

Example 1

Figure 1:
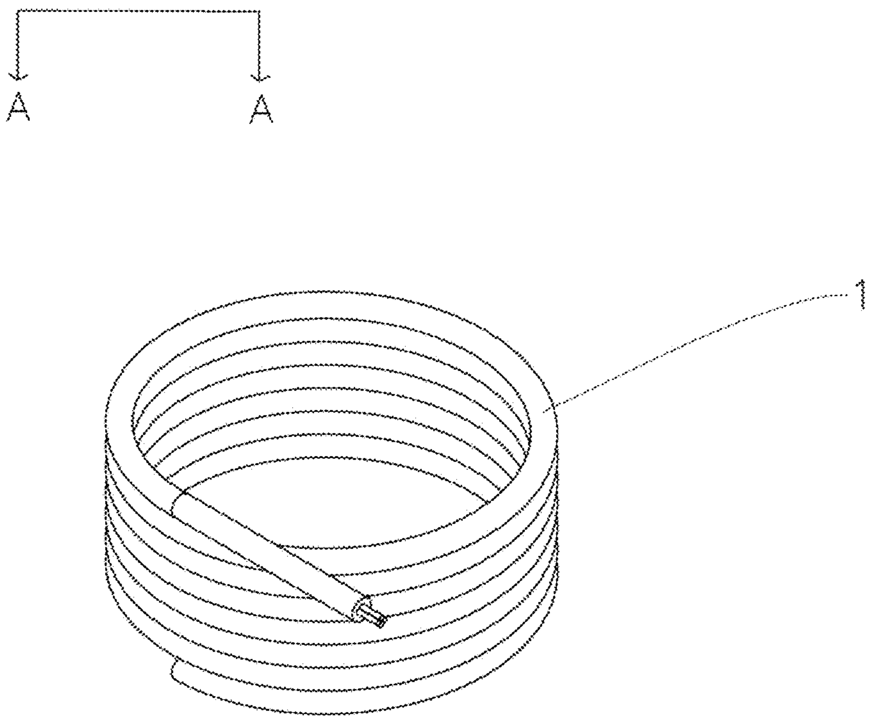
FIG. 1 shows a structure of a wire cable with a magnetic attraction effect in Example 1.
Figure 2:
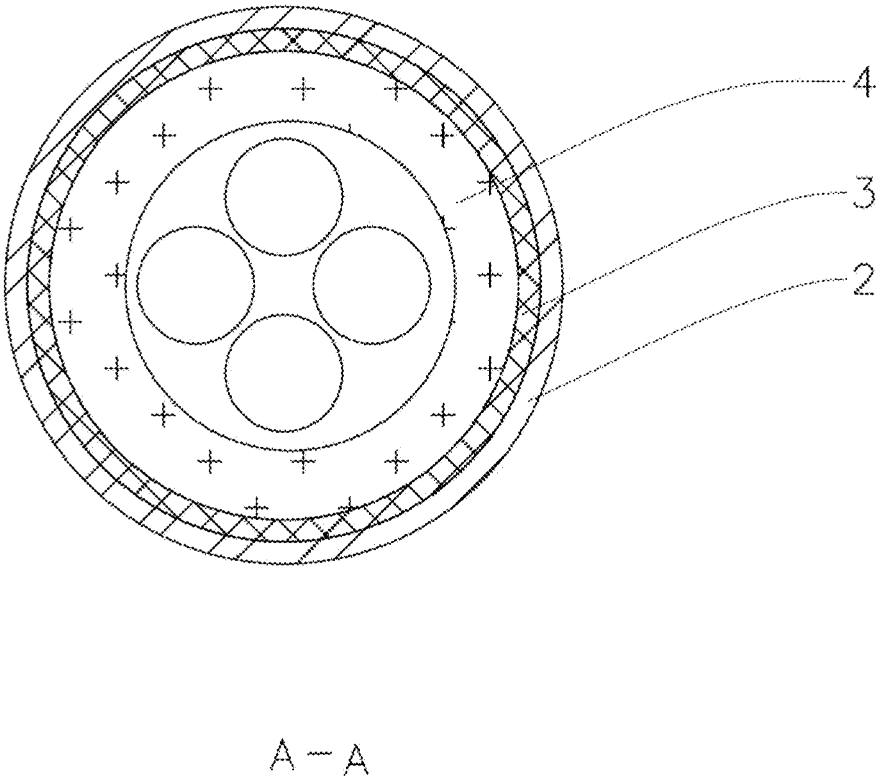
FIG. 2 is a cross-sectional view (A-A) of the structure of the wire cable with the magnetic attraction effect in Example 1.

A wire cable with a magnetic attraction effect was prepared by the method as follows:

S1, 400 g of a thermoplastic elastomer (polyurethane), 20 g of a compatilizer (a maleic anhydride grafted styrene-ethylene/butene-styrene block copolymer), 30 g of a stabilizer (triphenyl phosphite), 50 g of a lubricant (oleamide), 100 g of a phenolic resin and 400 g of a magnetic attraction filler were mixed to obtain a mixture 1;

S2, 800 g of a thermoplastic elastomer (polyurethane), 185 g of a phenolic resin, 10 g of a compatilizer (a maleic anhydride grafted styrene-ethylene-styrene block copolymer) and 5 g of a flexibilizer (chlorinated polyethylene) were mixed to obtain a mixture 2;

S3, the mixture 1 and the mixture 2 were simultaneously extruded in a double-layer co-extrusion manner, to obtain a magnetic attraction layer 4 and a protective layer 3 bonded together, as shown in FIG. 2; and S4, as shown in FIG. 2, braided wires were putted into a high-speed braiding machine, the wires are braided to form a braid layer 2 around the protective layer to obtain a semi-finished wire cable, and the semi-finished wire cable was magnetized by magnetizing equipment to obtain the wire cable with the magnetic attraction effect 1, as shown in FIG. 1.

The magnetic filler in Examples 1-3 was composed of FeCo, FeNi and Fe in a weight ratio of 4:5:2.

Differences between Examples 2-3 and Example 1 are as follows: raw materials for preparing the wire cable with the magnetic attraction effect have different types, amounts and parameters, and specific differences are as shown in Table 1.

TABLE 1

Types, amounts and parameters of the raw materials for preparing the wire cable with the magnetic attraction effect in Examples 1-3

| Types, amounts and parameters of experimental raw materials | | | Example 1 | Example 2 | Example 3 |
|---|---|---|---|---|---|
| S1 | Thermoplastic elastomer | Amount (g) | 400 | 450 | 500 |
| | | Type | Polyurethane | Styrene-butadiene-styrene triblock copolymer | Thermoplastic polyolefin (TPO) |
| | Compatilizer | Amount (g) | 20 | 25 | 30 |
| | | Type | Maleic anhydride grafted styrene-ethylene/butene-styrene block copolymer | Maleic anhydride grafted ethylene-octene copolymer | Maleic anhydride grafted ethylene-vinyl acetate copolymer |
| | Stabilizer | Amount (g) | 30 | 45 | 60 |
| | | Type | Triphenyl phosphite | Dilauryl thiodipropionate | Octyl diphenyl phosphite |
| | Lubricant | Amount (g) | 50 | 80 | 100 |
| | | Type | Oleamide | Ethylene-bis-stearamide | Calcium stearate |
| | Phenolic resin (g) | | 100 | 125 | 150 |
| | Magnetic attraction filler (g) | | 400 | 275 | 160 |
| S2 | Thermoplastic elastomer | Amount (g) | 800 | 850 | 900 |
| | | Type | Polyurethane | Styrene-butadiene-styrene triblock copolymer | Thermoplastic polyolefin (TPO) |
| | Phenolic resin (g) | | 185 | 127 | 70 |
| | Compatilizer | Amount (g) | 10 | 15 | 20 |
| | | Type | Maleic anhydride grafted styrene-ethylene-styrene block copolymer | Maleic anhydride grafted ethylene-octene copolymer | Maleic anhydride grafted ethylene-vinyl acetate copolymer |

TABLE 1-continued

| Types, amounts and parameters of experimental raw materials | | Example 1 | Example 2 | Example 3 |
|---|---|---|---|---|
| Flexibilizer | Amount (g) | 5 | 8 | 10 |
| | Type | Chlorinated polyethylene | Acrylate copolymer | Methyl methacrylate-butadiene-styrene terpolymer |

Types, amounts and parameters of the raw materials for preparing the wire cable with the magnetic attraction effect in Examples 1-3

Example 4

Provided is a wire cable with a magnetic attraction effect. Differences between this Example and Example 1 are as follows: the magnetic attraction filler is a modified magnetic attraction filler, and the modified magnetic attraction filler was prepared by the method as follows:

1) 400 g of a magnetic attraction filler was placed into 500 g of a solvent (ethanol), 80 g of a silane coupling agent (3-aminopropyltriethoxysilane) was added under stirring, a resulting solution was heated to 50° C., and the resulting solution was stirred for 1 h to obtain a silanized magnetic attraction filler mixture; and
2) a polymerization reaction was performed for 3 hours at 50° C. with the silanized magnetic attraction filler mixture, 80 g of vinylpyrrolidone, 80 g of methyl methacrylate, 2 g of a cross-linking agent (N,N'-methylenebisacrylamide) and 2 g of an initiator (azodiisobutyronitrile) under a protection of nitrogen, a product mixture was filtered to obtain a filter residue, and the filter residue was eluted to obtain the modified magnetic attraction filler.

Example 5

Provided is a wire cable with a magnetic attraction effect. Differences between this Example and Example 1 are as follows: the magnetic attraction filler is a modified magnetic attraction filler, and the modified magnetic attraction filler was prepared by the method as follows:

1) 400 g of a magnetic attraction filler was placed into 600 g of a solvent (ethyl acetate), 120 g of a silane coupling agent (acetyl trimethoxysilane) was added under stirring, a resulting solution was heated to 60° C., and the resulting solution was stirred for 2 h to obtain a silanized magnetic attraction filler mixture; and
2) a polymerization reaction was performed for 5 hours at 80° C. with the silanized magnetic attraction filler mixture, 120 g of vinylpyrrolidone, 60 g of methyl methacrylate, 6 g of a cross-linking agent (diallyl phthalate) and 4 g of an initiator (benzoyl peroxide) under a protection of nitrogen, a product mixture was filtered to obtain a filter residue, and the filter residue was eluted to obtain the modified magnetic attraction filler.

Example 6

Provided is a wire cable with a magnetic attraction effect. Differences between this Example and Example 1 are as follows: the magnetic attraction filler was composed of FeCo, FeNi, Fe, Co and Ni in a weight ratio of 4:5:4:1:5.

Example 7

Provided is a wire cable with a magnetic attraction effect. Differences between this Example and Example 4 are as follows: the magnetic attraction filler was composed of FeCo, FeNi, Fe, Co and Ni in a weight ratio of 6:10:4:2:5.

Example 8

Provided is a wire cable with a magnetic attraction effect. Differences between this Example and Example 1 are as follows: the lubricant was composed of oleamide, ethylene-bis-stearamide and calcium stearate in a weight ratio of 3:1:6.

Example 9

Provided is a wire cable with a magnetic attraction effect. Differences between this Example and Example 1 are as follows: the lubricant was composed of oleamide, ethylene-bis-stearamide and calcium stearate in a weight ratio of 5:2:6.

Example 10

Provided is a wire cable with a magnetic attraction effect. Differences between this Example and Example 7 are as follows: the phenolic resin used in steps S1 and S2 was a linear phenolic resin.

The phenolic resin was purchased from Shenzhen Jitian Chemical Co., Ltd., with the model of BF18.

COMPARATIVE EXAMPLES

Comparative Example 1

Provided is a wire cable with a magnetic attraction effect. Differences between this Comparative Example and Example 1 are as follows: the polyurethane used in steps S1 and S2 was replaced with SEBS in the protective layer.

The SEBS is purchased from Dongguan Xinxin New Material Co., Ltd., with the model of 6151.

Comparative Example 2

Provided is a wire cable with a magnetic attraction effect. Differences between this Comparative Example and Example 1 are as follows: the phenolic resin used in steps S1 and S2 was replaced with a K resin.

The K resin was purchased from Suzhou Yasai Plasticzation Co., Ltd., with the trade mark of KR03.

Comparative Example 3

Provided is a wire cable with a magnetic attraction effect. Differences between this Comparative Example and Example 1 are as follows: the polyurethane in the magnetic layer was replaced with SEBS.

The SEBS was purchased from Dongguan Xinxin New Material Co., Ltd., with the model of 6151.

Detection Method/Test Method

Magnetic attraction test: the wire cables prepared in Examples 1-10 and Comparative Examples 1-3 were bent into springs, adjacent electric coils were adsorbed together, a fixing rack was used to fix a first end of the wire cable, and a second end of the wire cable was pulled to fully extend the wire, and then the wire cable was released to automatically roll, and a rolling time was recorded. The shorter the rolling time, the better the magnetic attraction effect.

Stability test: the wire cables prepared in Examples 1-10 and Comparative Examples 1-3 were bent into springs, adjacent electric coils were adsorbed together, a fixing rack was used to fix a first end of the wire cable, and a second end of the wire cable was pulled to fully extend the wire, and then the wire cable was released. After repeated 3000 times, the wire was released to automatically roll. A rolling time was recorded, and whether the wire restores to the original shape was observed.

Layering test: the wire cables prepared in Examples 1-10 and Comparative Examples 1-3 were folded for 5000 times and then unfolded from the fold, and observed whether the magnetic attraction layer and the protective layer were layered. Experimental data were as shown in Table 2.

TABLE 2

Experimental data in Examples 1-10 and Comparative Examples 1-3

| Example/Comparative Example | Magnetic attraction test (s) | Stability test (s) | Layering test |
|---|---|---|---|
| Example 1 | 1.55 | 2.36 | No layering |
| Example 2 | 1.46 | 2.14 | No layering |
| Example 3 | 1.43 | 2.26 | No layering |
| Example 4 | 0.56 | 0.86 | No layering |
| Example 5 | 0.54 | 0.87 | No layering |
| Example 6 | 1.13 | 1.26 | No layering |
| Example 7 | 0.34 | 0.59 | No layering |
| Example 8 | 1.31 | 1.56 | No layering |
| Example 9 | 0.29 | 0.33 | No layering |
| Example 10 | 1.41 | 2.01 | No layering |
| Comparative Example 1 | 1.94 | Not restore to the original shape | Layering |
| Comparative Example 2 | 1.68 | Not restore to the original shape | No layering |
| Comparative Example 3 | 1.63 | 3.03 | Layering |

Comparing Example 1 with Comparative Examples 1-3, the automatic rolling time in the magnetic attraction test in Example 1 is shorter than that in Comparative Examples 1-3; a phenomenon that the wire has magnetic attraction but does not restore to the original shape occurs in the stability test in Comparative Examples 1-2; and a phenomenon of layering occurs in the layering test in Comparative Examples 1 and 3, which indicates that the automatic rolling performance of the wire can be increased, excellent automatic rolling performance is maintained, and no separation is ensured between the magnetic attraction layer and the protective layer by virtue of a combination of the thermoplastic elastomer and the phenolic resin.

Comparing Example 1 with Examples 4-5, the automatic rolling time in the magnetic attraction test in Example 1 is longer than that in Examples 4-5, and the automatic rolling time in the stability test in Examples 4-5 is shorter than that in Example 1, which indicates that the automatic rolling time of the wire can be further shortened by virtue of the modified magnetic filler prepared in the present application.

Comparing Example 1 with Example 6, the automatic rolling time in the magnetic attraction test in Example 1 is longer than that in Example 6, and the automatic rolling time in the stability test in Example 6 is shorter than that in Example 1.

Comparing Example 4 with Example 7, the automatic rolling time in the magnetic attraction test in Example 7 is longer than that in Example 4, and the automatic rolling time in the stability test in Example 7 is shorter than that in Example 4.

It can be seen from the experimental data in Examples 1 and 6, and Examples 4 and 7 that the automatic rolling time of the wire can be further shortened by optimizing the types of the magnetic attraction filler.

Comparing Example 1 with Example 8, the automatic rolling time in the magnetic attraction test in Example 1 is longer than that in Example 8, and the automatic rolling time in the stability test in Example 8 is shorter than that in Example 1.

Comparing Example 7 with Example 9, the automatic rolling time in the magnetic attraction test in Example 7 is longer than that in Example 9, and the automatic rolling time in the stability test in Example 9 is shorter than that in Example 7.

It can be seen from the experimental data in Examples 1 and 8, and Examples 7 and 9 that the automatic rolling time of the wire can be further shortened by optimizing the types of the lubricant.

Comparing Example 1 with Example 10, the automatic rolling time in the magnetic attraction test in Example 10 is longer than that in Example 1, and the automatic rolling time in the stability test in Example 10 is shorter than that in Example 1, which indicates that the automatic rolling time of the wire can be further shortened by optimizing the types of the phenolic resin.

The specific embodiments are only an explanation of the present application and are not a limitation of the present application. Those skilled in the art may make noncreative modifications to the present specific embodiments as needed after reading this specification, but as long as it falls within the scope of the claims of the present application, it is protected by the patent law.

LISTING OF REFERENCE SIGNS

1, wire cable with a magnetic attraction effect;
2, braid layer;
3, protective layer;
4, magnetic attraction layer.

What is claimed is:

1. A wire cable with a magnetic attraction effect, sequentially comprising a braid layer, a protective layer and a magnetic attraction layer from exterior to interior, wherein the magnetic attraction layer is prepared from the following raw materials in percentage by weight:

thermoplastic elastomer 40-50%;
compatilizer 2-3%;
stabilizer 3-6%;
lubricant 5-10%;
phenolic resin 10-15%; and
a balance is a magnetic attraction filler;
the protective layer is prepared from the following raw materials in percentage by weight:
  the thermoplastic elastomer 80-90%;
  the compatilizer 1-2%;

flexibilizer 0.5-1%, and a balance is the phenolic resin.

2. The wire cable with the magnetic attraction effect according to claim 1, wherein the magnetic attraction filler is a modified magnetic attraction filler, and is prepared by the following method:

1) Placing an initial magnetic attraction filler into a solvent, adding a silane coupling agent under stirring, heating a resulting solution to 50-60° C., and stirring the resulting solution for 1-2 h to obtain a silanized magnetic attraction filler mixture; and
2) Performing a polymerization reaction for 3-5 hours at 50-80° C. with the silanized magnetic attraction filler mixture, vinylpyrrolidone, methyl methacrylate, a cross-linking agent and an initiator under a protection of nitrogen, filtering a product mixture to obtain a filter residue, and eluting the filter residue to obtain the modified magnetic attraction filler.

3. The wire cable with the magnetic attraction effect according to claim 2, wherein the raw material used for preparing the modified magnetic attraction filler comprises the following components in parts by weight:

the initial magnetic attraction filler 20 parts;
the solvent 25-30 parts;
the silane coupling agent 4-6 parts;
the vinylpyrrolidone 4-6 parts;
the methyl methacrylate 2-3 parts;
the cross-linking agent 0.1-0.3 part; and
the initiator 0.1-0.2 part.

4. The wire cable with the magnetic attraction effect according to claim 1, wherein the magnetic attraction filler is composed of FeCo, FeNi, Fe, Co and Ni in a weight ratio of (4-6):(5-10):(2-4):(1-2):5.

5. The wire cable with the magnetic attraction effect according to claim 1, wherein the thermoplastic elastomer is at least one of a thermoplastic polyurethane elastomer, a styrenic thermoplastic elastomer, a thermoplastic olefin elastomer, a thermoplastic polyester elastomer or a thermoplastic polyamide elastomer.

6. The wire cable with the magnetic attraction effect according to claim 1, wherein the phenolic resin is a linear phenolic resin.

7. The wire cable with the magnetic attraction effect according to claim 1, wherein the compatilizer comprises at least one of a maleic anhydride grafted styrene-ethylene/butene styrene block copolymer, a maleic anhydride grafted ethylene-octene copolymer, a maleic anhydride grafted ethylene-vinyl acetate copolymer, a maleic anhydride grafted ethylene-butadiene block copolymer, maleic anhydride grafted polyurethane or maleic anhydride grafted polyethylene.

8. The wire cable with the magnetic attraction effect according to claim 1, wherein the lubricant is composed of oleamide, ethylene-bis-stearamide and calcium stearate in a weight ratio of (3-5):(1-2):6.

9. The wire cable with the magnetic attraction effect according to claim 1, wherein the flexibilizer comprises at least one of chlorinated polyethylene, a methyl methacrylate-butadiene-styrene terpolymer, an acrylate copolymer or a polyolefin elastomer.

10. A method for preparing the wire cable with the magnetic attraction effect according to claim 1, comprising the following preparation steps:

S1, mixing the thermoplastic elastomer, the compatilizer, the stabilizer, the lubricant, the phenolic resin and the magnetic attraction filler to obtain a first mixture;

S2, mixing the thermoplastic elastomer, the phenolic resin, the compatilizer and the flexibilizer to obtain a second mixture;

S3, simultaneously extruding the first mixture and the second mixture in a double-layer co-extrusion manner to obtain the magnetic attraction layer and the protective layer bonded together; and S4, putting braided wires into a high-speed braiding machine, braiding the braided wires to form the braid layer around the protective layer to obtain a semi-finished wire cable, and magnetizing the semi-finished wire cable by magnetizing equipment to obtain the wire cable with the magnetic attraction effect.

* * * * *